(12) United States Patent
Tsuchimochi

(10) Patent No.: US 10,380,426 B2
(45) Date of Patent: Aug. 13, 2019

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventor: Kazuki Tsuchimochi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/560,594

(22) PCT Filed: Mar. 23, 2016

(86) PCT No.: PCT/JP2016/059116
§ 371 (c)(1),
(2) Date: Sep. 22, 2017

(87) PCT Pub. No.: WO2016/152891
PCT Pub. Date: Sep. 29, 2016

(65) Prior Publication Data
US 2018/0089511 A1    Mar. 29, 2018

(30) Foreign Application Priority Data
Mar. 23, 2015 (JP) ................. 2015-059088

(51) Int. Cl.
*G06K 9/00* (2006.01)
*G06K 7/10* (2006.01)
(Continued)

(52) U.S. Cl.
CPC ..... *G06K 9/00671* (2013.01); *G06K 7/10722* (2013.01); *G06K 7/1413* (2013.01);
(Continued)

(58) Field of Classification Search
None
See application file for complete search history.

(56) References Cited

U.S. PATENT DOCUMENTS 8,245,838 B2 * 8/2012 Reichenbach ............ B07C 3/14
198/502.1
8,571,298 B2 * 10/2013 McQueen ................ G06K 9/00
235/378

(Continued)

FOREIGN PATENT DOCUMENTS

JP         09-114913 A    5/1997
JP       2001-028033 A    1/2001
(Continued)

OTHER PUBLICATIONS

Communication dated Aug. 7, 2018 issued by the Japanese Patent Office in counterpart application No. 2015-059088.

*Primary Examiner* — Jwalant Amin
(74) *Attorney, Agent, or Firm* — Sughrue Mion, PLLC

(57) ABSTRACT

The present invention provides an image processing apparatus (10) including a display image generation unit (11) that generates a display image, a display unit (12) that displays the display image so as to be superimposed on a user's field of vision, an imaging unit (13) that generates a captured image so as to include the user's field of vision, and a recognition unit (14) that analyzes the captured image, and specifies an identification code included in the captured image. The display image generation unit (11) generates the display image having emphasis information displayed at a position corresponding to the specified identification code in the user's field of vision.

8 Claims, 11 Drawing Sheets

(51) Int. Cl.
*G06K 7/14* (2006.01)
*G06K 19/06* (2006.01)
*G06K 9/20* (2006.01)
*G06T 7/73* (2017.01)
*G06T 11/60* (2006.01)
*G02B 27/01* (2006.01)
*H04N 5/74* (2006.01)

(52) U.S. Cl.
CPC ......... *G06K 7/1417* (2013.01); *G06K 7/1443* (2013.01); *G06K 7/1447* (2013.01); *G06K 9/2063* (2013.01); *G06K 19/06028* (2013.01); *G06K 19/06037* (2013.01); *G06T 7/73* (2017.01); *G02B 27/01* (2013.01); *G06T 11/60* (2013.01); *G06T 2207/30204* (2013.01); *H04N 5/7491* (2013.01)

(56) References Cited

U.S. PATENT DOCUMENTS

| | | | | |
|---|---|---|---|---|
| 8,727,209 | B1* | 5/2014 | Shih | G06Q 30/02 235/375 |
| 9,160,993 | B1* | 10/2015 | Lish | H04N 5/23229 |
| 2013/0112750 | A1* | 5/2013 | Negro | G06K 7/10871 235/454 |
| 2016/0300091 | A1* | 10/2016 | Cumoli | G06K 7/10722 |

FOREIGN PATENT DOCUMENTS

| | | | |
|---|---|---|---|
| JP | 2001028033 A | * | 1/2001 |
| JP | 2009-093489 A | | 4/2009 |
| JP | 2011-134079 A | | 7/2011 |
| JP | 2011134079 A | * | 7/2011 |
| JP | 2015-141215 A | | 8/2015 |
| WO | 2015/111655 A1 | | 7/2015 |

* cited by examiner

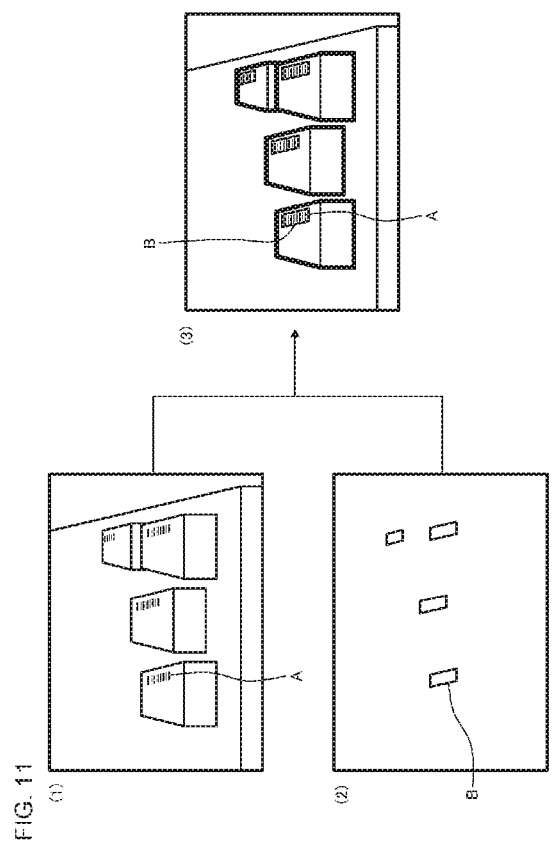

IMAGE PROCESSING APPARATUS, IMAGE PROCESSING METHOD, AND NON-TRANSITORY STORAGE MEDIUM

CROSS REFERENCE TO RELATED APPLICATIONS

This application is a National Stage of International Application No. PCT/JP2016/059116 filed Mar. 23, 2016, claiming priority based on Japanese Patent Application No. 2015-059088 filed Mar. 23, 2015, the contents of all of which are incorporated herein by reference in their entirety.

TECHNICAL FIELD

The present invention relates to an image processing apparatus, an image processing method, and a program.

BACKGROUND ART

Techniques associated with Patent Documents 1 and 2 are disclosed.

Patent Document 1 discloses a product processing apparatus including a head mounted display, an imaging apparatus, an image processing unit, a product information acquisition unit, and an information display unit.

The head mounted display includes a holding member formed in the shape of a spectacle frame. The holding member holds a light-transmissive member that makes it possible to visually observe code information attached to a product. A portion of the light-transmissive member allows display of a monitor.

The imaging apparatus captures an image of at least the code information attached to a product. The image processing unit displays image data acquired by image capture performed by the imaging apparatus on a portion of the light-transmissive member allowing display of a monitor. In addition, the image processing unit performs image processing on the image data and deciphers a product code included in the code information.

The product information acquisition unit acquires information of a product on the basis of the product code deciphered by the image processing unit. The information display unit displays at least the information of a product acquired by the product information acquisition unit on a monitor display unit of the head mounted display.

Patent Document 2 discloses a reading apparatus in which, in a case where plural bar codes are included in a captured image, a recognition process is performed using each of these bar codes as a processing object.

RELATED DOCUMENTS

Patent Documents

[Patent Document 1] Japanese Unexamined Patent Publication No. 2009-93489
[Patent Document 2] Japanese Unexamined Patent Publication No. 9-114913

SUMMARY OF THE INVENTION

Technical Problem

In a technique disclosed in Patent Document 1, when the image data is monitor-displayed on a portion of the light-transmissive member, a user's field of vision includes (1) an image which is monitor-displayed on a portion of the light-transmissive member, and (2) the view in front of a user which is seen through another portion of the light-transmissive member. A product included in the image obtained by capturing an image in the forward direction of a user, and product information obtained by reading the code information attached to the product are displayed on the image of (1).

In a case where only one product is present in front of a user, the user can associate the product present within the view of (2) with the product and the product information displayed within the image of (1). However, in a case where plural products are present in front of the user, the user is not able to determine which of the plural products present within the view of (2) the product and the product information displayed within the image of (1) correspond to. A technique disclosed in Patent Document 2 is not able to solve the problem.

An object of the present invention is to provide, in an apparatus that analyzes a captured image potentially including identification codes and provides the result to a user, a technique for allowing the user to easily recognize which identification code the provided analysis result corresponds to.

Solution To Problem

According to the present invention, there is provided an image processing apparatus including: a display image generation unit that generates a display image; a display unit that displays the display image so as to be superimposed on a user's field of vision; an imaging unit that generates a captured image so as to include the user's field of vision; and a recognition unit that analyzes the captured image, and specifies an identification code included in the captured image, wherein the display image generation unit generates the display image having emphasis information displayed at a position corresponding to the specified identification code in the user's field of vision.

In addition, according to the present invention, there is provided an image processing method executed by a computer, the method including: a display image generation step of generating a display image; a display step of displaying the display image so as to be superimposed on a user's field of vision; an imaging step of generating a captured image so as to include the user's field of vision; and a recognition step of analyzing the captured image and specifying an identification code included in the captured image, wherein the display image generation step includes generating the display image having emphasis information displayed at a position corresponding to the specified identification code in the user's field of vision.

In addition, according to the present invention, there is provided a program causing a computer to function as: a display image generation unit that generates a display image; a display unit that displays the display image so as to be superimposed on a user's field of vision; an imaging unit that generates a captured image so as to include the user's field of vision; and a recognition unit that analyzes the captured image, and specifies an identification code included in the captured image, wherein the display image generation unit is caused to generate the display image having emphasis information displayed at a position corresponding to the specified identification code in the user's field of vision.

In addition, according to the present invention, there is provided an image processing method executed by a computer, the method including: a display image generation step of generating a display image; a display step of displaying the display image so as to be superimposed on a user's field of vision; an imaging step of generating a captured image so as to include the user's field of vision; and a recognition step of analyzing the captured image, specifying an identification code included in the captured image, and performing a process of recognition on the specified identification code, wherein the display image generation step includes generating the display image having emphasis information displayed at a position corresponding to the recognized identification code or a position corresponding to the unrecognized identification code in the user's field of vision.

In addition, according to the present invention, there is provided a program causing a computer to function as: a display image generation unit that generates a display image; a display unit that displays the display image so as to be superimposed on a user's field of vision; an imaging unit that generates a captured image so as to include the user's field of vision; and a recognition unit that analyzes the captured image, specifies an identification code included in the captured image, and performs a process of recognition on the specified identification code, wherein the display image generation unit is caused to generate the display image having emphasis information displayed at a position corresponding to the recognized identification code or a position corresponding to the unrecognized identification code in the user's field of vision.

Advantageous Effects of Invention

According to the present invention, in an apparatus that analyzes a captured image potentially including identification codes, and provides the result to a user, it is possible for the user to easily recognize which identification code the provided analysis result corresponds to.

BRIEF DESCRIPTION OF THE DRAWINGS

The above and other objects, features, and advantages will be made clearer from preferred exemplary embodiments described below, and the following accompanying drawings.

FIG. 11 is a diagram illustrating an advantageous effect of display performed by the image processing apparatus of the present exemplary embodiment.

DESCRIPTION OF EXEMPLARY EMBODIMENTS

First, an example of a hardware configuration of an apparatus of the present exemplary embodiment will be described. Each unit included in the apparatus of the present exemplary embodiment is constituted by any combination of hardware and software based on a central processing unit (CPU), a memory, a program loaded into the memory, a storage unit (which can also store a program downloaded from a recording medium such as a compact disc (CD), a server on the Internet, or the like, in addition to a program stored from a step of shipping an apparatus in advance) such as a hard disk having the program stored thereon, and an interface for network connection of any computer. It will be understood by those skilled in the art that constitution methods and apparatuses thereof may be modified in various ways.

Figure 1:
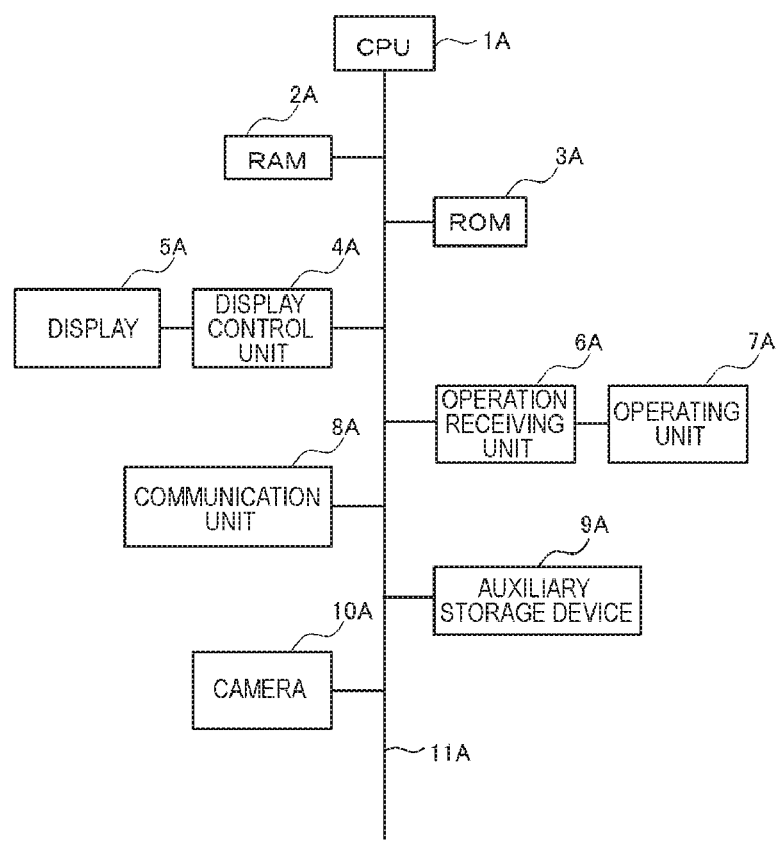
FIG. 1 is a diagram conceptually illustrating an example of a hardware configuration of an apparatus of the present exemplary embodiment.

FIG. 1 is a diagram conceptually illustrating an example of a hardware configuration of the apparatus of the present exemplary embodiment. As shown in the drawing, the apparatus of the present exemplary embodiment includes, for example, a CPU 1A, a random access memory (RAM) 2A, a read only memory (ROM) 3A, a display control unit 4A, a display 5A, an operation receiving unit 6A, an operating unit 7A, a communication unit 8A, an auxiliary storage apparatus 9A, a camera 10A, and the like which are connected to each other through a bus 11A. Note that although not shown in the drawing, the apparatus may include other elements such as an input and output interface connected to an external device in a wired manner, a microphone, and a speaker, in addition thereto.

The CPU 1A controls the entire computer of the apparatus together with each element. The ROM 3A includes an area for storing programs for operating the computer, various application programs, various setting data used when these programs operate, and the like. The RAM 2A includes an area, such as a work area in order for programs to operate, in which data is temporarily stored. The auxiliary storage apparatus 9A is, for example, a hard disc drive (HDD), and can store high-capacity data.

The display 5A is, for example, a transmission-type display (transparent display) constituted by a light-transmissive member. That is, the view beyond the display 5A is seen through the display. In a case where a display image is displayed on such a display 5A, the display image is superimposed before the view beyond the display 5A in the field of vision of a user who observes the display 5A. It should be noted that the display 5A may be a head mounted display. In this case, a transmission-type display is provided at a lens portion of goggles or spectacles.

The display control unit 4A performs various screen displays by reading out data stored in a video RAM (VRAM), performing a predetermined process on the read-out data, and then sending the data to the display 5A. The operation receiving unit 6A receives various operations through the operating unit 7A. The operating unit 7A includes an operation key, an operation button, a switch, a jog dial, and the like. Note that the operation receiving unit 6A may receive a predetermined gesture, performed in front of the camera 10A, as a predetermined operation.

The communication unit 8A is connected to a network such as the Internet or a local area network (LAN) in a wired and/or wireless manner, and communicates with other electronic apparatuses.

Hereinafter, the exemplary embodiments will be described. Note that each functional block diagram which is used in the description of the following exemplary embodiments represents a function-based block rather than a hardware-based configuration. In the drawings, each apparatus is described to be constituted by one apparatus, but its constitution unit is not limited thereto. That is, the respective apparatuses may be physically separated, and may be logically separated. Note that the same components are denoted by the same reference numerals and signs, and thus the description thereof will not be repeated.

<First Exemplary Embodiment>

First, the outline of the present exemplary embodiment will be described. An image processing apparatus of the present exemplary embodiment analyzes an image captured so as to include a user's field of vision, and retrieves a predetermined identification code represented by a figure or the like. In a case where an identification code is specified within the captured image, the image processing apparatus notifies a user of the specified identification code.

A transmission-type display is used in a notification unit of the present exemplary embodiment. The transmission-type display is located in front of a user, and is configured to allow a predetermined image to be displayed so as to be superimposed on the user's field of vision. In such a case, in the user's field of vision, the predetermined image displayed on the transmission-type display is superimposed on the view in front of the user. In the user's field of vision, the image processing apparatus displays a display image, having emphasis information (for example, predetermined mark) displayed at a position corresponding to the specified identification code, on the transmission-type display.

According to such an image processing apparatus, it is possible for a user to easily recognize an identification code specified by the image processing apparatus, on the basis of information within the field of vision, that is, a correspondence relation between emphasis information and an identification mark present within the field of vision.

Figure 2:
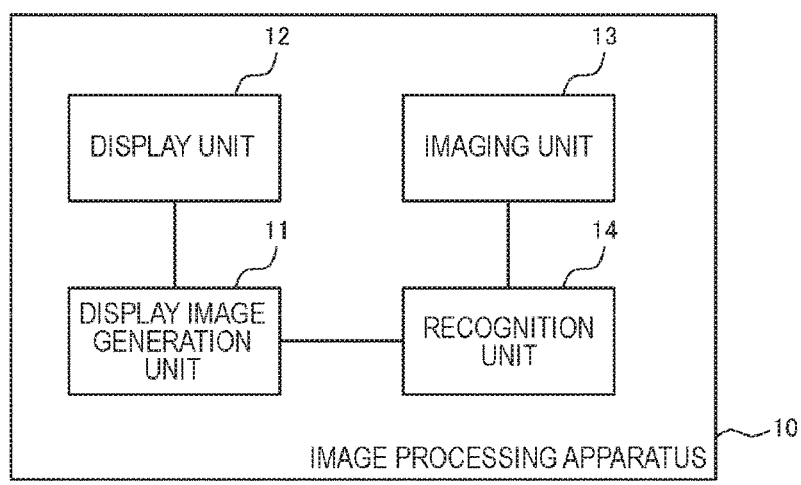
FIG. 2 is an example of a functional block diagram of an image processing apparatus of the present exemplary embodiment.

Next, the configuration of an image processing apparatus 10 of the present exemplary embodiment will be described in detail. FIG. 2 shows an example of a functional block diagram of the image processing apparatus 10 of the present exemplary embodiment. As shown in the drawing, the image processing apparatus 10 includes a display image generation unit 11, a display unit 12, an imaging unit 13, and a recognition unit 14.

The display unit 12 displays a display image so as to be superimposed on a user's field of vision. Specifically, the display unit 12 displays a display image so as to be superimposed on the view in front of a user which is present in a user's field of vision. The display unit 12 includes a transmission-type display. The display unit 12 displays a display image on the transmission-type display located in front of a user. With such a configuration, in a user's field of vision, the display image is superimposed on the view in front of the user which is present in the user's field of vision.

Figure 3:
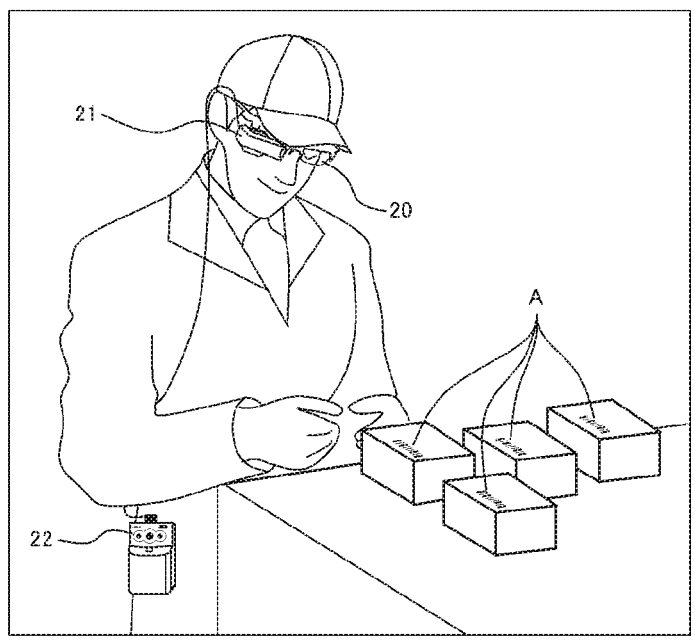
FIG. 3 is a diagram illustrating an application example of the image processing apparatus of the present exemplary embodiment.

The transmission-type display may be a wearable apparatus worn by a user, for example, a head mounted display. An example is schematically shown in FIG. 3. FIG. 3 shows a spectacles-type head mounted display. A lens portion 20 is constituted by a transmission-type display.

Referring back to FIG. 2, the display image generation unit 11 generates a display image. Though described in detail below, the result of image analysis performed by the recognition unit 14 is input to the display image generation unit 11. The display image generation unit 11 generates a display image on the basis of the result. The display image generated by the display image generation unit 11 is input to the display unit 12. The display unit 12 displays the display image so as to be superimposed on a user's field of vision.

In a case of the example of FIG. 3, the display image generation unit 11 may be constituted by, for example, a computer located within a processing apparatus 22. Communication between the display image generation unit 11 and the display unit 12 is realized by any communication standard in a wired and/or wireless manner.

Referring back to FIG. 2, the imaging unit 13 generates a captured image so as to include a user's field of vision. The imaging unit 13 (camera) is configured to capture an image of in the forward direction of a user (facing direction of a user). For example, the imaging unit 13 is configured such that its lens faces in the forward direction of a user. In addition, the imaging unit 13 is configured to have the direction of the lens changed in accordance with a change in the direction of a user's face.

For example, a camera is installed on an object worn on the head of a user in a predetermined direction, thereby allowing the configuration as described above to be realized. In a case of the example of FIG. 3, a camera 21 is installed onto a head mounted display worn on a user's face. The camera 21 is installed so as to capture an image in the forward direction of a user (facing direction of a user). In a case of this example, when the direction of a user's face changes, the direction of the lens of the camera 21 also changes so as to face the same direction in accordance therewith.

Referring back to FIG. 2, the recognition unit 14 analyzes an image captured by the imaging unit 13, and specifies identification codes included in (appearing in) the captured image. In a case where plural identification codes are present in the captured image, the recognition unit 14 can specify the plural identification codes. In a case of the example of FIG. 3, the recognition unit 14 may be constituted by, for example, a computer located within the processing apparatus 22. Communication between the imaging unit 13 and the recognition unit 14 is realized by any communication standard in a wired and/or wireless manner.

An identification code represented by a figure or the like is attached to each object to be tested. For example, a one-dimensional code such as a bar code or a two-dimensional code such as a QR code (Registered Trademark) is attached to the test object. An identification code represented by a figure or the like is included in the image obtained by capturing such a test object. The recognition unit 14 holds, in advance, the feature of the outer appearance of the identification code represented by a figure or the like. The recognition unit 14 specifies a place in which the feature is shown up within the captured image.

The outer appearances of the identification codes have peculiarities according to respective standards. The identification codes have respective different outer appearances in their details while satisfying the requirements of standards, and thus are distinguishable from each other. In this manner, a common feature and features different from each other are present in the outer appearances of plural identification codes. A feature used in a process of specifying identification codes included in the captured image may be set to a feature common to plural identification codes.

The recognition unit 14 inputs the analysis result of the captured image, that is, information indicating a position within the captured image of each determined identification code to the display image generation unit 11.

The display image generation unit 11 generates a display image on the basis of the information which is input from the recognition unit 14. Specifically, the display image generation unit 11 generates a display image having emphasis information displayed at a position corresponding to a specified identification code in a user's field of vision. In a case where the recognition unit 14 has specified plural identification codes, the display image generation unit 11 generates a display image having the emphasis information displayed at a position corresponding to each of the plural identification codes.

In a case where the display unit 12 displays a display image, the display image is superimposed on the view in front of a user, in the user's field of vision. An identification code which is actually present in front and emphasis information which is displayed as a display image are included in the user's field of vision. The "position corresponding to a specified identification code" at which emphasis information is displayed includes every position at which a user can intuitively recognize that the specified identification code and the emphasis information correspond to each other, on the basis of the information within the field of vision. For example, within the field of vision, display may be performed at a position where the identification code and the emphasis information are superimposed on each other, and display may be performed so that the emphasis information is located around the identification code.

The emphasis information may be able to be emphasized within a user's field of vision, and can be constituted by, for example, arrows, other figures, signs, characters, numbers, marks, photos, and the like.

The display image generation unit 11 holds, in advance, a conversion rule (such as, for example, a conversion expression constituted by a matrix or the like) for converting coordinates within an image captured by the imaging unit 13 into coordinates within a display image displayed on a transmission-type display. In a case where information indicating a position within the captured image of each specified identification code is acquired from the recognition unit 14, the position of each identification code is converted into the coordinates within a display image in accordance with the conversion rule. The display image generation unit 11 generates a display image having emphasis information disposed at a position corresponding to the coordinates after conversion.

The conversion rule may be generated on the basis of parameters such as the direction of the lens or the distortion of the lens of the imaging unit 13 (camera), the direction of a transmission-type display (lens portion 20 of a head mounted display), a relative positional relationship between the imaging unit 13 and the transmission-type display, or a relative positional relationship between the transmission-type display and a user's eyes. In a case of the head mounted display shown in FIG. 3, these parameters are determined in advance. Therefore, the conversion rule can be created in advance, and be held in the display image generation unit 11. Note that a unit that converts the coordinates within a captured image into the coordinates within a display image can be realized according to the related art, and thus a detailed description thereof herein will not be given.

Here, reference will be made to FIGS. 3 and 4 to describe an example of a display image which is generated by the display image generation unit 11 and display of a display image which is performed by the display unit 12.

Figure 4:
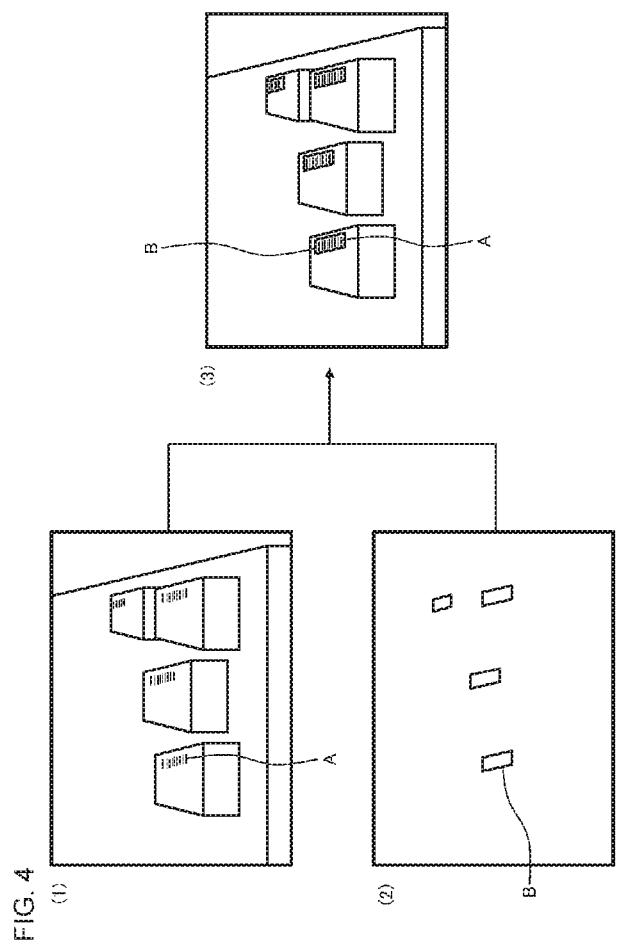
FIG. 4 is a diagram illustrating an advantageous effect of display performed by the image processing apparatus of the present exemplary embodiment.

FIG. 4(1) shows a user's field of vision through a see-through-type display in a state where a display image is not displayed. This corresponds to the user's field of vision of FIG. 3. A work table and four test objects placed on the work table are present in the user's field of vision. An identification code (bar code) A represented by a figure or the like is attached to each of the four test objects.

FIG. 4(2) is a display image generated by the display image generation unit 11. In the example, figures having a rectangular shape are displayed as emphasis information B. In the display image, portions other than portions in which the emphasis information B is displayed are transparent. The display image is displayed on the see-through-type display, that is, the lens portion 20 of FIG. 3.

FIG. 4(3) shows a user's field of vision through the see-through-type display in a state where the display image is displayed. The display image (FIG. 4(2)) is superimposed on the view in front of a user (FIG. 4(1)). The emphasis information B is present at a position corresponding to the identification code A.

A user can intuitively recognize that the identification codes A of all the four test objects present in front are specified by the image processing apparatus 10, on the basis of the field of vision as shown in FIG. 4(3).

Note that, as described above, the position corresponding to the identification code A at which the emphasis information B is displayed may be a position enabling a user to intuitively recognize the emphasis information B and the identification code A corresponding to each other. As shown in FIG. 4(3), the emphasis information B may contain the identification code A, and the emphasis information B may be superimposed on the identification code A. In addition, the emphasis information B may be located around the identification code A. Besides, the emphasis information B may emphatically display a test object to which the identification code A is attached, in addition to emphasis display of the identification code A (see FIG. 11). These premises are the same as those in all the following exemplary embodiments. In addition, these premises for the emphasis information B are also the same as those in emphasis information C which will be described in a second exemplary embodiment.

Figure 5:
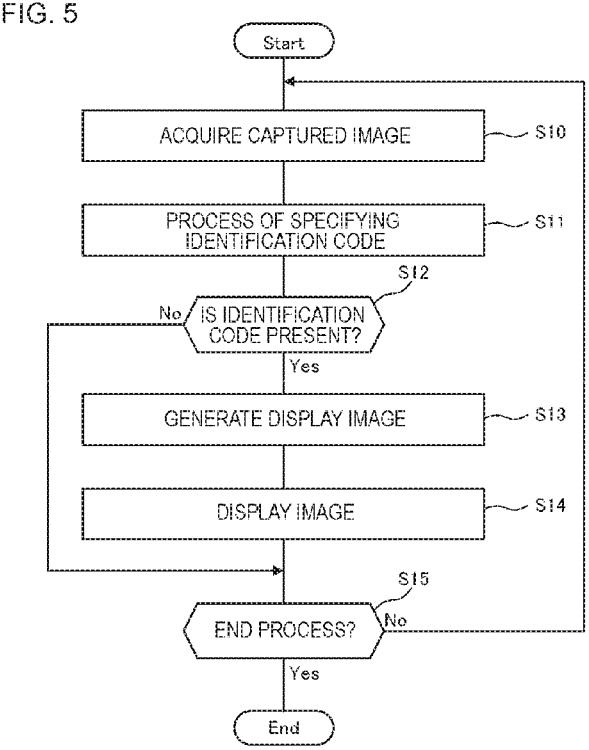
FIG. 5 is a flow diagram illustrating an example of a flow of processes of the image processing apparatus of the present exemplary embodiment.

Next, an example of a flow of processes of the image processing apparatus 10 of the present exemplary embodiment will be described with reference to the flow diagram of FIG. 5.

In a case where the imaging unit 13 captures an image in the forward direction of a user (facing direction of a user), and generates a captured image so as to include the user's field of vision (S10), the recognition unit 14 analyzes the captured image, and performs a process of specifying an identification code represented by a figure or the like (S11). In a case where an identification code is not present within the captured image (No of S12), the process proceeds to S15.

In a case where an identification code is present within the captured image (Yes of S12), the recognition unit 14 inputs information indicating a position within the captured image of each determined identification code to the display image generation unit 11. The display image generation unit 11 generates a display image having the emphasis information displayed at a position corresponding to the specified identification code in the user's field of vision, on the basis of the information (S13). The display unit 12 displays the display image generated in S13 so as to be superimposed on the user's field of vision (S14). Thereafter, the process proceeds to S15.

In S15, it is determined whether an instruction for terminating the process is inputted. In a case where the instruction is not inputted (No of S15), the process return to S10, and the same process is repeated by acquiring the next captured image. On the other hand, in a case where the instruction is inputted (Yes of S15), the process is terminated.

The image processing apparatus 10 of the present exemplary embodiment described above can display the display image so as to be superimposed on the user's field of vision, using the see-through-type display. In such a case, the display image displayed on the transmission-type display is superimposed on the view in front of a user, in the user's field of vision. In a case where the image processing apparatus 10 captures an image in the forward direction of a user (facing direction of a user), and specifies identification codes within the captured image generated so as to include the user's field of vision, the apparatus can generate a display image having the emphasis information displayed at a position corresponding to the specified identification code, and display the generated image on the see-through-type display.

According to such an image processing apparatus 10, it is possible to emphatically display the specified identification code in the user's field of vision in which the view in front of the user and the display image are superimposed on each other. Therefore, it is possible for a user to intuitively recognize an identification code specified by the image processing apparatus 10 from information within his or her field of vision.

In addition, in a case where plural identification codes are present within the captured image, the image processing apparatus 10 of the present exemplary embodiment can specify these identification codes, and perform a recognition process on the respective identification codes. It is possible to emphatically display each specified identification code. In this manner, according to the present exemplary embodiment in which plural identification codes can be collectively processed, work efficiency is improved. In addition, in a case of the present exemplary embodiment, even in a case where plural identification codes are present in front of a user, it is possible for the user to intuitively recognize which identification code the analysis result of the image processing apparatus 10 corresponds to.

In this manner, according to the image processing apparatus 10 of the present exemplary embodiment, in an apparatus that analyzes a captured image potentially including identification codes, and provides the result to a user, it is possible for the user to easily recognize which identification code the provided analysis result corresponds to.

<Second Exemplary Embodiment>

An image processing apparatus 10 of the present exemplary embodiment is different from that of first exemplary embodiment, in that recognition results for the specified identification codes are displayed in a distinguishable manner n. Other configurations are the same as those of the first exemplary embodiment.

FIG. 2 shows a functional block diagram of the image processing apparatus 10 of the present exemplary embodiment, as is the case with the first exemplary embodiment. The configurations of the display unit 12 and the imaging unit 13 are the same as those of the first exemplary embodiment.

As described in the first exemplary embodiment, the recognition unit 14 specifies identification codes represented by a figure or the like appearing in the captured image. The recognition unit 14 deciphers each of the specified identification codes. That is, the recognition unit 14 deciphers a pattern of the identification code represented by a figure or the like, and recognizes information (for example, identification code consisting of a combination of numbers or characters) corresponding to the pattern. In a case where plural identification codes appear in the captured image, the recognition unit 14 specifies the plural identification codes, and performs a process of recognition on the respective identification codes.

The recognition unit 14 associates information indicating whether the identification code is recognized with information indicating a position within the captured image of each specified identification code, and inputs the result to the display image generation unit 11.

The wording "the identification code is recognized" means that the identification code represented by a figure or the like is deciphered, and that information corresponding to the pattern has been recognized. The wording "the identification code is not recognized" means that a process of deciphering the identification code represented by a figure or the like is performed, but information corresponding to the pattern has not been recognized. The identification code may not be able to be recognized, for example, due to the reason that "the identification code appearing in the captured image is small, and its detailed pattern is obscured", "a portion of the pattern does not appear in the captured image by the superimposition of another object", "a portion in which the pattern is obscured is present due to the light reflection condition", or the like.

As is the case with the first exemplary embodiment, the display image generation unit 11 generates a display image having the emphasis information displayed at a position corresponding to the specified identification code in the user's field of vision. The display image generation unit 11 generates a display image in which an identification code recognized by the recognition unit 14 and an identification code which is not recognized are distinguishable from each other. A method of displaying these identification codes in a distinguishable manner is not particularly limited.

Here, reference will be made to FIG. 6 to describe an example of a display image which is generated by the display image generation unit 11 and display of a display image which is performed by the display unit 12.

Figure 6:
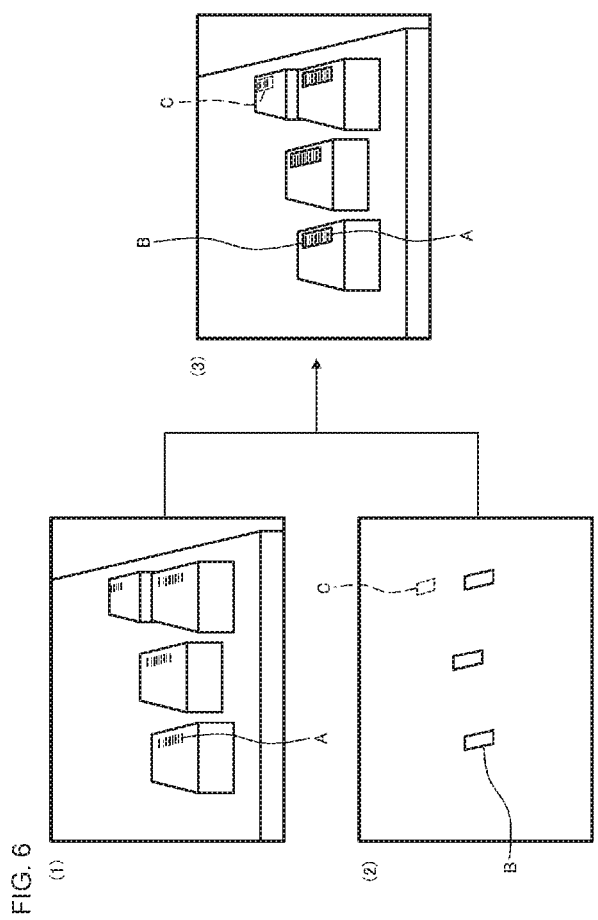
FIG. 6 is a diagram illustrating an advantageous effect of display performed by the image processing apparatus of the present exemplary embodiment.

FIG. 6(1) shows a user's field of vision through a see-through-type display in a state where a display image is not displayed. This corresponds to the user's field of vision of FIG. 3. A work table and four test objects placed on the work table are present in the user's field of vision. An identification code (bar code) A represented by a figure or the like is attached to each of the four test objects.

FIG. 6(2) is a display image generated by the display image generation unit 11. In the example, emphasis information B and emphasis information C which are distinguishable from each other are displayed. The emphasis information B is a rectangular shape of a solid line, whereas the emphasis information C is a rectangle of a dotted line. The emphasis information B is displayed at a position corresponding to the identification code A recognized by the recognition unit 14. On the other hand, the emphasis information C is displayed at a position corresponding to the identification code A which is specified by the recognition unit 14 but is not recognized.

In the display image, portions other than portions in which the emphasis information B and the emphasis information C are displayed are transparent. The display image is displayed on the see-through-type display, that is, the lens portion 20 of FIG. 3.

FIG. 6(3) shows a user's field of vision through the see-through-type display in a state where the display image is displayed. The display image (FIG. 6(2)) is superimposed on the view in front of a user (FIG. 6(1)). The emphasis information B and the emphasis information C are present at positions corresponding to the identification codes A. Note that the emphasis information B is displayed at a position corresponding to the identification code recognized by the recognition unit 14, and the emphasis information C is displayed at a position corresponding to the identification code which is not recognized by the recognition unit 14.

A user can intuitively recognize that the identification codes A of all the four test objects present in front are specified by the image processing apparatus 10, on the basis of the field of vision as shown in FIG. 6(3). In addition, it is possible to intuitively recognize that the identification code A on the right-hand side of the back corresponding to the emphasis information C is not recognized by the image processing apparatus 10, and that other identification codes A corresponding to the emphasis information B are recognized by the image processing apparatus 10.

Figure 7:
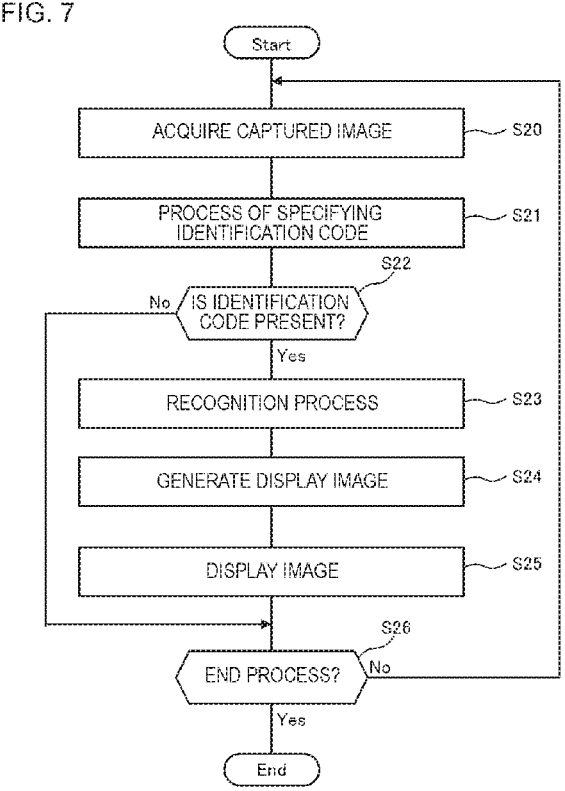
FIG. 7 is a flow diagram illustrating an example of a flow of processes of the image processing apparatus of the present exemplary embodiment.

Next, an example of a flow of processes of the image processing apparatus 10 of the present exemplary embodiment will be described with reference to the flow diagram of FIG. 7.

In a case where the imaging unit 13 captures an image in the forward direction of a user (facing direction of a user), and generates a captured image so as to include the user's field of vision (S20), the recognition unit 14 analyzes the captured image, and performs a process of identifying an identification code represented by a figure or the like (S21). In a case where an identification code is not present within the captured image (No of S22), the process proceeds to S26.

In a case where the identification code is present within the captured image (Yes of S22), the recognition unit 14 performs a process of recognition on the specified identification code (S23). The recognition unit 14 associate information indicating whether the identification code is recognized with information indicating a position within the captured image of each specified identification code, and inputs the result to the display image generation unit 11. The display image generation unit 11 generates a display image which has emphasis information displayed at a position corresponding to the specified identification code in the user's field of vision, on the basis of the information and in which the recognized identification code and the unrecognized identification code are distinguishable from each other (S24).

The display unit 12 displays the display image generated in S24 so as to be superimposed on the user's field of vision (S25). Thereafter, the process proceeds to S26.

In S26, it is determined whether an instruction for terminating the process is inputted. In a case where the instruction is not inputted (No of S26), the process return to S20, and the same process is repeated by acquiring the next captured image. On the other hand, in a case where the instruction is inputted (Yes of S26), the process is terminated.

According to the present exemplary embodiment described above, it is possible to realize the same advantageous effect as that of the first exemplary embodiment. In addition, according to the present exemplary embodiment, it is possible for a user to intuitively recognize whether each identification code present in the field of vision is recognized by the image processing apparatus 10.

Therefore, it is possible for a user to move a test object to which the recognized identification code is attached, that is, a test object of which information has been read off the work table, to leave only a test object to which the unrecognized identification code is attached on the work table, and to perform a recognition process again. In addition, it is possible for a user to move the test object to which the unrecognized identification code is attached to a position where an image of the test object can be easily captured, and to perform the recognition process again. As a result, the unrecognized identification code can be recognized in the next process.

In this manner, according to the present exemplary embodiment, it is possible for a user to intuitively recognize the test object to which the recognized identification code is attached and the test object to which the unrecognized identification code is attached, and to appropriately cope with the respective test objects. As a result, inspection efficiency is improved.

<Third Exemplary Embodiment>

An image processing apparatus 10 of the present exemplary embodiment is different from those of the first and second exemplary embodiments, in that only the recognized identification code is emphatically displayed. Other configurations are the same as those of the first and second exemplary embodiments.

FIG. 2 shows a functional block diagram of the image processing apparatus 10 of the present exemplary embodiment, as are the cases with the first and second exemplary embodiments. The configurations of the display unit 12 and the imaging unit 13 are the same as those of the first and second exemplary embodiments.

As described in the first exemplary embodiment, the recognition unit 14 specifies identification codes represented by a figure or the like appearing in the captured image. In addition, as described in the second exemplary embodiment, the recognition unit 14 performs a process of recognition on the specified identification code. In a case where plural identification codes appear in the captured image, the recognition unit 14 specifies the plural identification codes, and performs a process of recognition on the respective identification codes.

The recognition unit 14 inputs information indicating a position within the captured image of each identification code which is specified and is recognized, to the display image generation unit 11. Note that, as described in the second exemplary embodiment, the recognition unit 14 may associate information indicating whether the identification code is recognized with information indicating a position within the captured image of each specified identification code, and input the result to the display image generation unit 11.

The display image generation unit 11 generates a display image having the emphasis information displayed at a position corresponding to the identification code recognized by the recognition unit 14 in the user's field of vision. The emphasis information is not displayed at a position corresponding to the identification code which is specified by the recognition unit 14 but is not recognized.

Here, reference will be made to FIG. 8 to describe an example of a display image which is generated by the display image generation unit 11 and display of a display image which is performed by the display unit 12.

Figure 8:
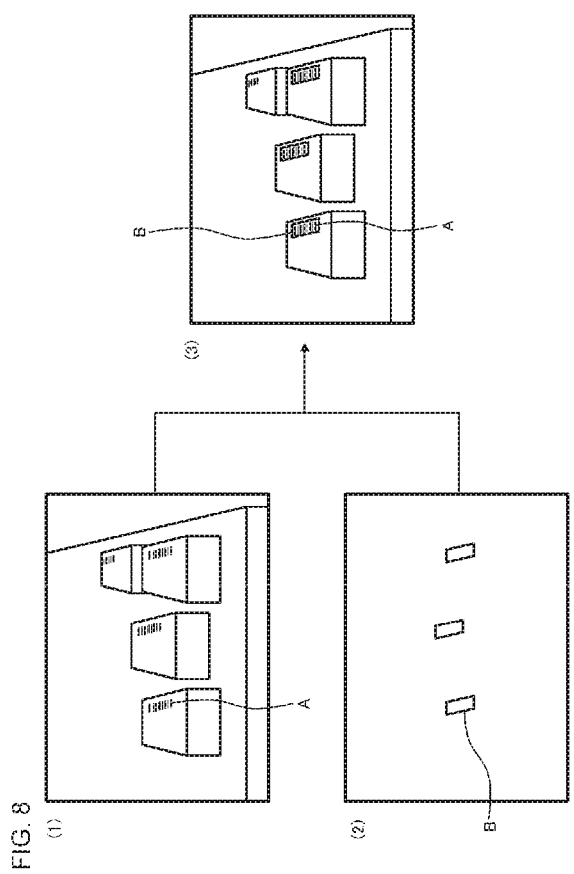
FIG. 8 is a diagram illustrating an advantageous effect of display performed by the image processing apparatus of the present exemplary embodiment.

FIG. 8(1) shows a user's field of vision through a see-through-type display in a state where a display image is not displayed. This corresponds to the user's field of vision of FIG. 3. A work table and four test objects placed on the work table are present in the user's field of vision. An identification code (bar code) A represented by a figure or the like is attached to each of the four test objects.

FIG. 8(2) is a display image generated by the display image generation unit 11. In the example, the emphasis information B is displayed. The emphasis information B is displayed at a position corresponding to the identification code A recognized by the recognition unit 14. In the display image, portions other than portions in which the emphasis information B is displayed are transparent. The display image is displayed on the see-through-type display, that is, the lens portion 20 of FIG. 3.

FIG. 8(3) shows a user's field of vision through the see-through-type display in a state where the display image is displayed. The display image (FIG. 8(2)) is superimposed on the view in front of a user (FIG. 8(1)). The emphasis information B is present at a position corresponding to the identification code A recognized by the recognition unit 14.

A user can intuitively recognize that three identification codes A corresponding to the emphasis information B among four test objects present in the front are recognized by the image processing apparatus 10, on the basis of the field of vision as shown in FIG. 8(3).

Next, an example of a flow of processes of the image processing apparatus 10 of the present exemplary embodiment will be described with reference to the flow diagram of FIG. 7.

In a case where the imaging unit 13 captures an image in the forward direction of a user (facing direction of a user), and generates a captured image so as to include the user's field of vision (S20), the recognition unit 14 analyzes the captured image, and performs a process of specifying an identification code represented by a figure or the like (S21). In a case where an identification code is not present within the captured image (No of S22), the process proceeds to S26.

In a case where the identification code is present within the captured image (Yes of S22), the recognition unit 14 performs a process of recognition on the specified identification code (S23). The recognition unit 14 inputs, for example, information indicating a position within the captured image of each recognized identification code to the display image generation unit 11. The display image generation unit 11 generates a display image having the emphasis information displayed at a position corresponding to the recognized identification code in the user's field of vision, on the basis of the information (S24).

The display unit 12 displays the display image generated in S24 so as to be superimposed on the user's field of vision (S25). Thereafter, the process proceeds to S26.

In S26, it is determined whether an instruction for terminating the process is inputted. In a case where the instruction is not inputted (No of S26), the process return to S20, and the same process is repeated by acquiring the next captured image. On the other hand, in a case where the instruction is inputted (Yes of S26), the process is terminated.

According to the present exemplary embodiment described above, it is possible to realize the same advantageous effect as those of the first and second exemplary embodiments. In addition, according to the present exemplary embodiment, it is possible for a user to intuitively recognize which identification code of those present in the field of vision is recognized by the image processing apparatus 10.

Therefore, it is possible for a user to move a test object to which the recognized identification code is attached, that is, a test object of which information has been read off the work table, to leave only a test object to which the unrecognized identification code is attached on the work table, and to perform a recognition process again. In addition, it is possible for a user to move the test object to which the unrecognized identification code is attached to a position where an image of the test object can be easily captured, and to perform the recognition process again. As a result, the unrecognized identification code can be recognized in the next process.

In this manner, according to the present exemplary embodiment, it is possible for a user to intuitively recognize the test object to which the recognized identification code is attached and the test object to which the unrecognized identification code is attached, and to appropriately cope with the respective test objects. As a result, inspection efficiency is improved.

<Fourth Exemplary Embodiment>

An image processing apparatus 10 of the present exemplary embodiment is different from those of the first to third exemplary embodiments, in that only an identification code which is not able to be recognized is emphatically displayed. Other configurations are the same as those of the first to third exemplary embodiments.

FIG. 2 shows a functional block diagram of the image processing apparatus 10 of the present exemplary embodiment, as are the cases with the first to third exemplary embodiments. The configurations of the display unit 12 and the imaging unit 13 are the same as those of the first to third exemplary embodiments.

As described in the first exemplary embodiment, the recognition unit 14 specifies identification codes represented by a figure or the like appearing in the captured image. In addition, as described in the second exemplary embodiment, the recognition unit 14 performs a process of recognition on the specified identification code. In a case where plural identification codes appear in the captured image, the recognition unit 14 specifies the plural identification codes, and performs a process of recognition on the respective identification codes.

The recognition unit 14 inputs information indicating a position within the captured image of each identification code which is specified but is not recognized, to the display image generation unit 11. Note that, as described in the second exemplary embodiment, the recognition unit 14 may associate information indicating whether the identification code is recognized with information indicating a position within the captured image of each determined identification code, and input the result to the display image generation unit 11.

The display image generation unit 11 generates a display image having the emphasis information displayed at a position corresponding to an identification code which is specified by the recognition unit 14 but is not recognized in the user's field of vision. The emphasis information is not displayed at a position corresponding to an identification code which is specified by the recognition unit 14 and is recognized.

Here, reference will be made to FIG. 9 to describe an example of a display image which is generated by the display image generation unit 11 and display of a display image which is performed by the display unit 12.

Figure 9:
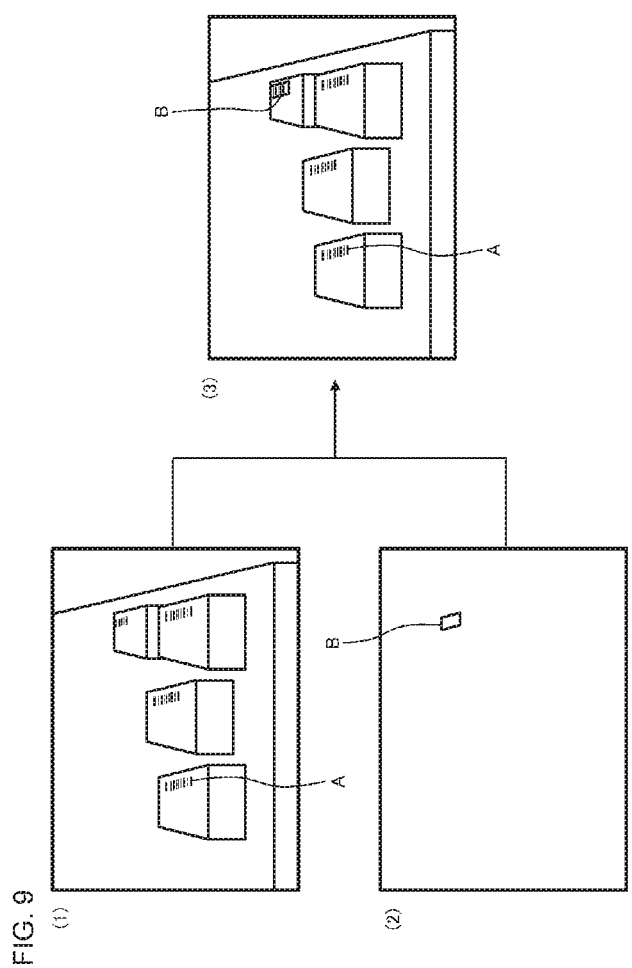
FIG. 9 is a diagram illustrating an advantageous effect of display performed by the image processing apparatus of the present exemplary embodiment.

FIG. 9(1) shows a user's field of vision through a see-through-type display in a state where a display image is not displayed. This corresponds to the user's field of vision of FIG. 3. A work table and four test objects placed on the work table are present in the user's field of vision. An identification code (bar code) A represented by a figure or the like is attached to each of the four test objects.

FIG. 9(2) is a display image generated by the display image generation unit 11. In the example, the emphasis information B is displayed. The emphasis information B is displayed at a position corresponding to the identification code A which is specified by the recognition unit 14 but is not recognized. In the display image, portions other than portions in which the emphasis information B is displayed are transparent. The display image is displayed on the see-through-type display, that is, the lens portion 20 of FIG. 3.

FIG. 9(3) shows a user's field of vision through the see-through-type display in a state where the display image is displayed. The display image (FIG. 9(2)) is superimposed on the view in front of a user (FIG. 9(1)). The emphasis information B is present at a position corresponding to the identification code A which is specified by the recognition unit 14 but is not recognized.

A user can intuitively recognize that one identification code A corresponding to the emphasis information B among four test objects present in front is specified by the image processing apparatus 10 but is not recognized, on the basis of the field of vision as shown in FIG. 9(3).

Next, an example of a flow of processes of the image processing apparatus 10 of the present exemplary embodiment will be described with reference to the flow diagram of FIG. 7.

In a case where the imaging unit 13 captures an image in the forward direction of a user (facing direction of a user), and generates a captured image so as to include the user's field of vision (S20), the recognition unit 14 analyzes the captured image, and performs a process of specifying an identification code represented by a figure or the like (S21). In a case where an identification code is not present within the captured image (No of S22), the process proceeds to S26.

In a case where the identification code is present within the captured image (Yes of S22), the recognition unit 14 performs a process of recognition on the specified identification code (S23). The recognition unit 14 inputs, for example, information indicating a position within the captured image of each identification code which is specified but is not recognized, to the display image generation unit 11. The display image generation unit 11 generates a display image having the emphasis information displayed at a position corresponding to an identification code which is specified but is not recognized in the user's field of vision, on the basis of the information (S24).

The display unit 12 displays the display image generated in S24 so as to be superimposed on the user's field of vision (S25). Thereafter, the process proceeds to S26.

In S26, it is determined whether an instruction for terminating the process is inputted. In a case where the instruction is not inputted (No of S26), the process return to S20, and the same process is repeated by acquiring the next captured image. On the other hand, in a case where the instruction is inputted (Yes of S26), the process is terminated.

According to the present exemplary embodiment described above, it is possible to realize the same advantageous effect as those of the first to third exemplary embodiments. In addition, according to the present exemplary embodiment, it is possible for a user to intuitively recognize which identification code of those present in the field of vision is specified by the image processing apparatus 10 but is not recognized.

Therefore, it is possible for a user to move the test object to which the unrecognized identification code is attached to a position where an image of the test object can be easily captured, and to perform the recognition process again. As a result, the unrecognized identification code can be recognized in the next process.

In this manner, according to the present exemplary embodiment, it is possible for a user to intuitively recognize the test object to which the unrecognized identification code is attached, and to appropriately cope therewith. As a result, inspection efficiency is improved.

<Fifth Exemplary Embodiment>

An image processing apparatus 10 of the present exemplary embodiment is different from those of the first to fourth exemplary embodiments, in that a series of processes such as the generation of the captured image, the analysis of the captured image, the generation of the display image, and the display of the display image are performed in accordance with an instruction input from a user. Other configurations are the same as those of the first to fourth exemplary embodiments.

Figure 10:
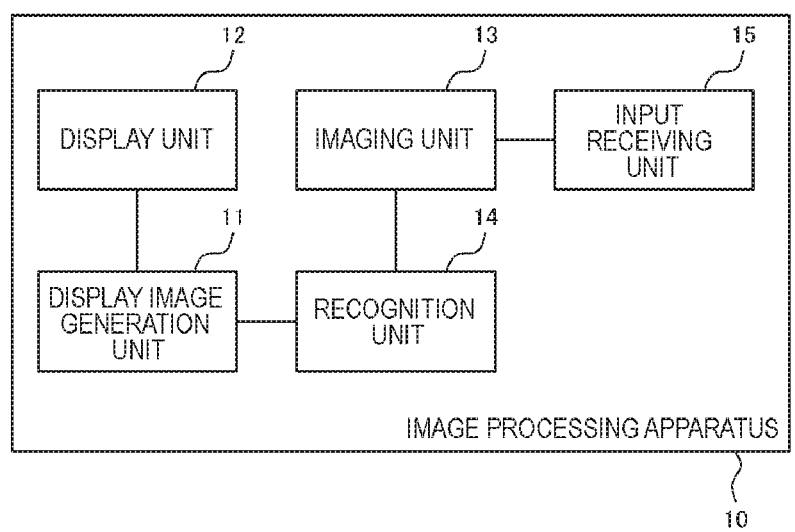
FIG. 10 is an example of a functional block diagram of the image processing apparatus of the present exemplary embodiment.

FIG. 10 shows an example of a functional block diagram of the image processing apparatus 10 of the present exemplary embodiment. As shown in the drawing, the image processing apparatus 10 includes a display image generation unit 11, a display unit 12, an imaging unit 13, a recognition unit 14, and an input receiving unit 15.

The input receiving unit 15 receives a start instruction input from a user. The input receiving unit 15 may receive the start instruction input in accordance with pressing down a predetermined operation button, and may receive the start instruction input in accordance with a predetermined gesture before a camera (imaging unit 13). Besides, the start instruction input may be received in accordance with inputting predetermined utterance contents through a microphone.

The imaging unit 13 starts to generate the captured image in accordance with the start instruction input received by the input receiving unit 15. The recognition unit 14 starts to analyze the captured image in accordance with the generation of the captured image performed by the imaging unit 13. The display image generation unit 11 starts to generate the display image in accordance with the generation of a result of the analysis of the captured image performed by the recognition unit 14. The display unit 12 starts to display the display image in accordance with the generation of the display image performed by the display image generation unit 11. Configurations other than the display image generation unit 11, the display unit 12, the imaging unit 13 and the recognition unit 14 are the same as those of the first to fourth exemplary embodiments.

According to the present exemplary embodiment described above, it is possible to realize the same advantageous effect as those of the first to fourth exemplary embodiments. In addition, according to the present exemplary embodiment, the display image is not always displayed, and the display image can be displayed in accordance with an instruction from a user. Therefore, a user can cause the display image to be displayed at a timing when the display image is required, and not to be displayed at a timing when the display image is not required. As a result, it is possible to reduce the inconvenience of the display image interfering with a user's other work.

Hereinafter, examples of reference forms are appended.

1. An image processing apparatus including:
a display image generation unit that generates a display image;
a display unit that displays the display image so as to be superimposed on a user's field of vision;
an imaging unit that generates a captured image so as to include the user's field of vision; and a recognition unit that analyzes the captured image, and specifies an identification code included in the captured image, wherein the display image generation unit generates the display image in which emphasis information is displayed at a position corresponding to the specified identification code in the user's field of vision.

2. The image processing apparatus according to 1, wherein the recognition unit performs a process of recognition on the specified identification code, and the display image generation unit generates the display image in which a recognized identification code and an unrecognized identification code are distinguishable from each other.

3. The image processing apparatus according to 1 or 2, wherein in a case where plural identification codes are included in the captured image, the recognition unit specifies the plural identification codes, and the display image generation unit generates the display image having the emphasis information displayed at a position corresponding to each of the plural specified identification codes in the user's field of vision.

4. An image processing apparatus including:

a display image generation unit that generates a display image;

a display unit that displays the display image so as to be superimposed on a user's field of vision;

an imaging unit that generates a captured image so as to include the user's field of vision; and a recognition unit that analyzes the captured image, specifies an identification code included in the captured image, and performs a process of recognition on the specified identification code, wherein the display image generation unit generates the display image having emphasis information displayed at a position corresponding to a recognized identification code or a position corresponding to an unrecognized identification code in the user's field of vision.

5. The image processing apparatus according to 4, wherein in a case where plural identification codes is included in the captured image, the recognition unit specifies the plural identification codes, and performs a process of recognition on the respective identification codes, and the display image generation unit generates the display image having the emphasis information displayed at a position corresponding to each of plural recognized identification codes or a position corresponding to each of plural unrecognized identification codes in the user's field of vision.

6. The image processing apparatus according to any one of 1 to 5, further including an input receiving unit that receives a start instruction input from a user, wherein the imaging unit starts to generate the captured image in accordance with the start instruction input, the recognition unit starts to analyze the captured image in accordance with the generation of the captured image, the display image generation unit starts to generate the display image in accordance with generation of a result of the analysis of the captured image, and the display unit starts to display the display image in accordance with the generation of the display image.

7. The image processing apparatus according to any one of 1 to 6, wherein the display unit includes a transmission-type display, and displays the display image on the transmission-type display.

8. The image processing apparatus according to any one of 1 to 7, wherein the display unit includes a head mounted display, and displays the display image on the head mounted display.

9. An image processing method executed by a computer, the method including:

a display image generation step of generating a display image;

a display step of displaying the display image so as to be superimposed on a user's field of vision;

an imaging step of generating a captured image so as to include the user's field of vision; and a recognition step of analyzing the captured image and specifying an identification code included in the captured image, wherein the display image generation step includes generating the display image having emphasis information displayed at a position corresponding to the specified identification code in the user's field of vision.

9-2. The image processing method according to 9, wherein the recognition step includes performing a process of recognition on the specified identification code, and the display image generation step includes generating the display image in which a recognized identification code and an unrecognized identification code are distinguishable from each other.

9-3. The image processing method according to 9 or 9-2, wherein in a case where plural identification codes are included in the captured image, the recognition step includes specifying the plural identification codes, and the display image generation step includes generating the display image having the emphasis information displayed at a position corresponding to each of the plural specified identification codes in the user's field of vision.

9-4. The image processing method executed by the computer according to any one of 9 to 9-3, the method further including an input receiving step of receiving a start instruction input from a user, wherein the imaging step includes starting to generate the captured image in accordance with the start instruction input, the recognition step includes starting to analyze the captured image in accordance with the generation of the captured image, the display image generation step includes starting to generate the display image in accordance with generation of a result of the analysis of the captured image, and the display step includes starting to display the display image in accordance with the generation of the display image.

9-5. The image processing method according to any one of 9 to 9-4, wherein the display step includes displaying the display image on a transmission-type display.

9-6. The image processing method according to any one of 9 to 9-5, wherein the display step includes displaying the display image on a head mounted display.

10. A program causing a computer to function as:

a display image generation unit that generates a display image;

a display unit that displays the display image so as to be superimposed on a user's field of vision;

an imaging unit that generates a captured image so as to include the user's field of vision; and a recognition unit that analyzes the captured image, and specifies an identification code included in the captured image, wherein the display image generation unit is caused to generate the display image having emphasis information displayed at a position corresponding to the specified identification code in the user's field of vision.

10-2. The program according to 10, wherein the recognition unit is caused to perform a process of recognition on the specified identification code, and the display image generation unit is caused to generate the display image in which a recognized identification code and an unrecognized identification code are distinguishable from each other.

10-3. The program according to 10 or 10-2, wherein in a case where plural identification codes are included in the captured image, the recognition unit is caused to specify the plural identification codes, and the display image generation unit is caused to generate the display image having the emphasis information displayed at a position corresponding to each of the plural specified identification codes in the user's field of vision.

10-4. The program according to any one of 10 to 10-3, causing the computer to further function as an input receiving unit that receives a start instruction input from a user, wherein the imaging unit is caused to start to generate the captured image in accordance with the start instruction input, the recognition unit is caused to start to analyze the captured image in accordance with the generation of the captured image, the display image generation unit is caused to start to generate the display image in accordance with generation of a result of the analysis of the captured image, and the display unit is caused to start to display the display image in accordance with the generation of the display image.

10-5. The program according to any one of 10 to 10-4, wherein the display unit is caused to display the display image on a transmission-type display.

10-6. The program according to any one of 10 to 10-5, wherein the display unit is caused to display the display image on a head mounted display.

11. An image processing method executed by a computer, the method including:

a display image generation step of generating a display image;

a display step of displaying the display image so as to be superimposed on a user's field of vision;

an imaging step of generating a captured image so as to include the user's field of vision; and a recognition step of analyzing the captured image, specifying an identification code included in the captured image, and performing a process of recognition on the specified identification code, wherein the display image generation step includes generating the display image having emphasis information displayed at a position corresponding to a recognized identification code or a position corresponding to an unrecognized identification code in the user's field of vision.

11-2. The image processing method according to 11, wherein in a case where plural identification codes are included in the captured image, the recognition step includes specifying the plural identification codes, and performing a process of recognition on the respective identification codes, and the display image generation step includes generating the display image having the emphasis information displayed at a position corresponding to each of plural recognized identification codes or a position corresponding to each of plural unrecognized identification codes in the user's field of vision.

11-3. The image processing method executed by the computer according to 11 or 11-2, the method further including an input receiving step of receiving a start instruction input from a user, wherein the imaging step includes starting to generate the captured image in accordance with the start instruction input, the recognition step includes starting to analyze the captured image in accordance with the generation of the captured image, the display image generation step includes starting to generate the display image in accordance with generation of a result of the analysis of the captured image, and the display step includes starting to display the display image in accordance with the generation of the display image.

11-4. The image processing method according to any one of 11 to 11-3, wherein the display step includes displaying the display image on a transmission-type display.

11-5. The image processing method according to any one of 11 to 11-4, wherein the display step includes displaying the display image on a head mounted display.

12. A program causing a computer to function as:

a display image generation unit that generates a display image;

a display unit that displays the display image so as to be superimposed on a user's field of vision;

an imaging unit that generates a captured image so as to include the user's field of vision; and a recognition unit that analyzes the captured image, specifies an identification code included in the captured image, and performs a process of recognition on the specified identification code, wherein the display image generation unit is caused to generate the display image having emphasis information displayed at a position corresponding to a recognized identification code or a position corresponding to a unrecognized identification code in the user's field of vision.

12-2. The program according to 12, wherein in a case where plural identification codes are included in the captured image, the recognition unit is caused to specify the plural identification codes, and to perform a process of recognition on the respective identification codes, and the display image generation unit is caused to generate the display image having the emphasis information displayed at a position corresponding to each of plural recognized identification codes or a position corresponding to each of plural unrecognized identification codes in the user's field of vision.

12-3. The program according to 12 or 12-3, causing the computer to further function as an input receiving unit that receives a start instruction input from a user, wherein the imaging unit is caused to start to generate the captured image in accordance with the start instruction input, the recognition unit is caused to start to analyze the captured image in accordance with the generation of the captured image, the display image generation unit is caused to start to generate the display image in accordance with generation of a result of the analysis of the captured image, and the display unit is caused to start to display the display image in accordance with the generation of the display image.

12-4. The program according to any one of 12 to 12-3, wherein the display unit is caused to display the display image on a transmission-type display.

12-5. The program according to any one of 12 to 12-4, wherein the display unit is caused to display the display image on a head mounted display.

This application claims priority from Japanese Patent Application No. 2015-059088 filed on Mar. 23, 2015, the content of which is incorporated herein by reference in its entirety.

The invention claimed is:

1. An image processing apparatus comprising:
a display image generation unit configured to generate a first display image;
a display unit configured to display the first display image so as to be superimposed on a user's field of vision;
an imaging unit configured to generate a first captured image so as to include the user's field of vision; and
a recognition unit configured to analyze the first captured image, specify a first identification code included in the first captured image, and perform a process of recognition on the specific first identification code,
wherein the display image generation unit is configured to generate the first display image having first specific information displayed at a position corresponding to the specified first identification code in the user's field of vision,
wherein the first captured image further includes a second identification code which is different from the identification code, the second identification code being unrecognized by the recognition unit by an analysis of the first captured image,
wherein the display image generation unit is further configured to generate the first display image having second specific information displayed at a position corresponding to the second identification code in the user's field of vision, and
wherein the first specific information is movable with a first object, of which the first identification code is attached, such that when the first specific information moves with the first object, the second specific information may remain at a position corresponding to a second object, of which the second identification code is attached.

2. The image processing apparatus according to claim 1, wherein in a case where more than two identification codes are included in the captured image, the recognition unit is configured to specify the respective identification codes, and
the display image generation unit is configured to generate the first display image having respective specific information displayed at respective positions corresponding to each of the respective specified identification codes in the user's field of vision.

3. The image processing apparatus according to claim 1, further comprising an input receiving unit configured to receive a start instruction input from the user,
wherein the imaging unit is configured to start generating the first captured image in accordance with the start instruction input,
wherein the recognition unit is configured to start the analysis of the first captured image in accordance with the generation of the captured image,
wherein the display image generation unit is configured to start generation of the first display image in accordance with a generation of a result of the analysis of the first captured image, and
wherein the display unit is configured to start display of the first display image in accordance with the generation of the first display image.

4. The image processing apparatus according to claim 1, wherein the display unit includes a transmission-type display, and is configured to display the first display image on the transmission-type display.

5. The image processing apparatus according to claim 1, wherein the display unit includes a head mounted display, and is configured to display the first image on the head mounted display.

6. The image processing apparatus of claim 1,
wherein the imaging unit is further configured to generate a second captured image after the user moves the first object of which the first specific information is superimposed thereon and leaves in place the second object having the second specific information superimposed thereon, the second captured image including the user's field of vision,
wherein the recognition unit is further configured to analyze the second captured image, and
wherein the display image generation unit is further configured to generate a second display image, the second display image having the second specific information displayed at a position corresponding to the second identification code in the user's field of vision.

7. An image processing method executed by a computer, the image processing method comprising:
a first display image generation step of generating a first display image;
a first display step of displaying the first display image so as to be superimposed on a user's field of vision;
a first imaging step of generating a first captured image so as to include the user's field of vision; and
a first recognition step of analyzing the first captured image, specifying a first identification code included in the first captured image, and recognizing the specific first identification code,
wherein the first display image generation step includes generating the first display image having first specific information displayed at a position corresponding to the specified first identification code in the user's field of vision,
wherein the first captured image further includes a second identification code which is different from the first identification code, the second identification code being unrecognized during the first recognition step by the analysis of the first captured image,
wherein the first display image generation step further includes generating the first display image having second specific information displayed at a position corresponding to the second identification code in the user's field of vision, and
wherein the first specific information is movable with a first object, of which the first identification code is attached, such the method further comprises moving the first specific information with the first object, such that the second specific information may remain at a position corresponding to a second object, of which the second identification code is attached.

8. A non-transitory storage medium storing a program causing a computer to function as:
a display image generation unit that generates a first display image;
a display unit that displays the first display image so as to be superimposed on a user's field of vision;

an imaging unit that generates a first captured image so as to include the user's field of vision; and a recognition unit that analyzes the first captured image, specifies a first identification code included in the first captured image, and performs a process of recognition on the specified first identification code, wherein the display image generation unit is is configured to generate the first display image having first specific information displayed at a position corresponding to the specified first identification code in the user's field of vision, wherein the first captured image further includes a second identification code which is different from the first identification code, the second identification code being unrecognized by the recognition unit by an analysis of the first captured image, wherein the display image generation unit further configured to generate the first display image having second specific information displayed at a position corresponding to the second identification code in the user's field of vision, and wherein the first specific information is movable with a first object, of which the first identification code is attached, such that when the first specific information moves with the first object, the second specific information may remain at a position corresponding to a second object, of which the second identification code is attached.

* * * * *

UNITED STATES PATENT AND TRADEMARK OFFICE
CERTIFICATE OF CORRECTION

PATENT NO. : 10,380,426 B2  
APPLICATION NO. : 15/560594  
DATED : August 13, 2019  
INVENTOR(S) : Kazuki Tsuchimochi Page 1 of 1

It is certified that error appears in the above-identified patent and that said Letters Patent is hereby corrected as shown below:

On the Title Page

Column 2, Other Publications, Line 2; After "2015-059088.", insert
--¶International Search Report of PCT/JP2016/059116 dated Jun. 7, 2016.--

In the Specification

Column 10, Line 59; Delete "Cis" and insert --C is-- therefor

In the Claims

Column 21, Line 23; In Claim 1, delete "specific" and insert --specified-- therefor Column 21, Line 30; In Claim 1, after "the", insert --first--

Column 22, Line 38; In Claim 7, delete "specific" and insert --specified-- therefor Column 23, Line 7; In Claim 8, delete "is is" and insert --is-- therefor Column 23, Line 17; In Claim 8, after "unit", insert --is--

Signed and Sealed this  
Fourteenth Day of January, 2020

Andrei Iancu  
*Director of the United States Patent and Trademark Office*